United States Patent [19]

Miller

[11] 4,039,607

[45] Aug. 2, 1977

[54] METHOD FOR PRECISION CASTING OF CLAD OPTICAL COMPONENTS

[75] Inventor: Glen Elwood Miller, Redondo, Wash.

[73] Assignee: The Boeing Company, Seattle, Wash.

[21] Appl. No.: 684,575

[22] Filed: May 10, 1976

[51] Int. Cl.[2] .............................................. B29D 11/00
[52] U.S. Cl. ........................................ 264/1; 65/3 A;
  65/DIG. 7; 156/294; 264/90; 264/102; 264/308
[58] Field of Search ...................... 264/1, 90, 102, 174, 264/308, DIG. 75, DIG. 25; 156/294 65/3 A, 4 B, DIG. 7

[56] References Cited

U.S. PATENT DOCUMENTS

| 3,382,121 | 5/1968 | Sherlock | 156/94 X |
| 3,742,107 | 6/1973 | Hawkins | 264/1 X |
| 3,912,362 | 10/1975 | Hudson | 65/DIG. 7 |
| 3,982,916 | 9/1976 | Miller | 65/3 A |

Primary Examiner—Robert L. Lindsay, Jr.
Attorney, Agent, or Firm—Brown, Murray, Flick & Peckham

[57] ABSTRACT

Special-purpose transition and fittings for optical fibers or bundles of optical fibers are produced by selecting a hollow shell having an internal surface defining a desired barrier configuration. The shell is filled with a liquid barrier material under an applied vacuum and then partially drained to provide a liquid cladding of the barrier material which is then cured. A core of fiber optic material is cast against the cured cladding of the barrier material under an applied vacuum after which optical entrance and exit surfaces are formed on the cast core for joining with an optical fiber.

8 Claims, 4 Drawing Figures

METHOD FOR PRECISION CASTING OF CLAD OPTICAL COMPONENTS

BACKGROUND OF THE INVENTION

This invention relates to a method for precision casting of clad optical components, and more particularly to the production of reinforced clad optical components, including complex clad optical shapes produced by casting plastic materials at a low cost and with a consistently high precision while at the same time avoiding the need for polishing or other surface treatments to the optical boundary. More particularly, the present invention is addressed to such a process for forming complex clad optical shapes wherein an extremely fine finish at the boundary surface is attainable without requiring an equally-fine finish upon the internal surface of a hollow shell that is used to form the component and employed, if desired, for reinforcement of the component.

An optical fiber or light pipe as it is sometimes referred to in the art, consists basically of a cylindrical core surrounded by a cladding. Both the core and the cladding are formed of materials possessing high optical transmittance at the desired wavelength. The core material has refractive index slightly higher than the refractive index of the cladding material. The materials employed for this purpose may be solids, liquids or gases. Light is propagated along the length of the fiber or light pipe by total internal reflection in accordance with Snell's Law at the boundary between the core and the cladding. Absorption and scattering of light conducted by the optical fiber represent losses due to imperfections in the core material, inadequate smoothness at the boundary between the cladding and the core and by contaminants in the optical fiber material. Glass optical fibers are normally produced by a continuous drawing process at a carefully-controlled temperature. Crown or soda limeglass or other glass may be used to produce the glass optical fibers. On the other hand, plastic optical fibers have many desirable qualities and are normally produced by a continuous extrusion process. These are but a few examples of the type of optical fibers that are well known in the art and may be selected to form the core and/or cladding in the process of the present invention.

To provide a system employing light-conducting optical fibers, it is frequently necessary to utilize a variety of special-purpose transitions and fittings to adapt optical fibers to other optical fibers having different characteristics or to adapt optical fibers to other devices. Such special-purpose transitions and fittings are required to perform powersplitting functions, signal-combining functions or directionalcoupling functions. It is to be understood that the expression "optical fibers" as used herein is intended to mean a single optical fiber or bundles of optical fibers as is appropriate to the description. When fabricating such transitions and fittings, the fabrication process is frequently complicated by requirements for varying cross sections and multiple branches. These requirements give rise to serious fabrication problems which the present invention is designed to overcome. Lighconducting components, such as transitions and fittings, must have a continuity of core material that is maintained throughout the component to prevent excessive loss due to reflections. This requires that the joints must be formed with great precision and then cemented or fused together with great care. Furthermore, the continuity of the cladding in the component must be maintained throughout to prevent unguided propagation or leakage at the discontinuities. Moreover, the boundary between the core and the cladding of a component must remain extremely smooth throughout the component to minimize scattering of light while propagated along the component. It is essentially impossible or at least excessively expensive to employ conventional techniques to fabricate light-conducting optical fiber components including fittings and transitions while meeting these requirements.

The novel process of the present invention includes the utilization of many modern plastics possessing excellent optical properties and providing, in addition, the ability to cast complex shapes at a relatively low cost. Many such plastics also maintain good optical properties over a very wide temperature range. It is to be understood, of course, that materials other than plastics may be employed to produce components with complex shapes for systems utilizing optical fibers by the novel process disclosed herein. When conventional techniques are employed to cast core material of an optical component, such as a fitting and transition, it is possible to apply a cladding of material having a different, i.e., lower, index of refraction by dipping or spraying the cladding material onto the cast core material. Such a process is relatively practical; however, the boundary surfaces either must be polished prior to cladding or the molds must be sufficiently smooth and free of fissures, particularly at parting surfaces of the mold so as to provide the necessary fine finish at the boundary surface.

SUMMARY OF THE INVENTION

It is an object of the present invention to provide a method of producing complex clad optical shapes for use in a light-conducting optical fiber system wherein the optical shape is cast from glass material including plastic materials with a consistently high precision and at a low production cost.

It is a further object of the present invention to provide a method for producing complex clad optical shapes wherein the boundary surface between a cast core and boundary material is produced in a manner to avoid the need for polishing or other surface preparation treatments which has heretofore been a necessary requirement.

It is another object of the present invention to provide a method for producing complex clad optical shapes wherein the process includes a production of an extremely fine finish at the boundary surface between cladding and a cast core, which finish is achieved without requiring an equally-fine finish on a mold employed to produce the complex clad optical shape.

It is still another object of the present invention to provide a method for producing complex clad optical shapes wherein such shapes are produced with an inherently mechanical reinforcement so as to permit the use of such optical shapes as components with reinforcement at elevated temperatures which may otherwise produce deformation or other deterioration to the component even though the optical properties of the cast material core remain acceptable.

In accordance with the present invention there is provided a method for precision casting of clad optical components for use with a light-conducting optical fiber, the method includes the steps of selecting a hollow shell having an internal surface defining a desired barrier configuration to reflect electromagnetic wave energy, filling the shell with a liquid barrier material to completely wet the internal surface of the shell with the liquid barrier material, forming a liquid cladding of barrier material upon the internal surface of the shell by incomplete draining of the barrier material from the shell, thereafter curing the liquid cladding of barrier material remaining upon the internal surface of the shell to form a desired optical barrier, thereafter casting a core of fiber optical material having an index of refraction greater than the index of refraction of the cured barrier material, and thereafter forming optical entrance and exit surfaces upon the cast core for adjoining with the end of at least one optical fiber. It is preferred to subject the shell to an applied vacuum to facilitate complete wetting of the shell surface by the liquid barrier material by preventing entrapment of gases. It is also preferred to apply a vacuum for a similar purpose while casting the core material.

More specifically, according to the preferred method of the present invention, the hollow shell remains a part of the precision casting of the clad optical component for providing a mechanical reinforcement therefor. The viscosity of the barrier material is selected so as to form on the internal surface of the shell a desired optical quality boundary surface between the cured cladding of barrier material and the cast core of fiber optic material. The shell is fabricated from materials selected from the group consisting of glass, metal, ceramic and plastic. Such material is also suitable for use as the liquid barrier material as well as the core of fiber optic material. The preferred form of liquid barrier material and fiber optic material is selected from the group consisting of catalyzed liquid resin and liquid thermoplastic.

These features and advantages of the present invention as well as others will be more fully understood when the following description is read in light of the accompanying drawings, in which.

Figure 1:
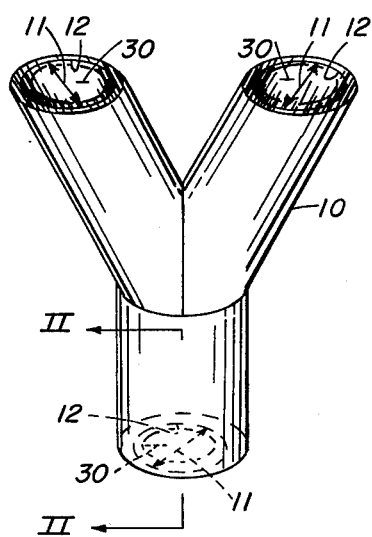
FIG. 1 is a perspective view of a Y-shape precision casting of a clad optical component produced according to the method of the present invention.

As is shown in FIG. 1, the clad optical component has a Y-shape configuration formed by precision casting and reinforced by a shell 10. This shell has a hollow form conforming to the finished product such that the internal dimensions 11 are essentially equal to those of the finished product. To produce the clad optical component shown, the shell may be produced from tubing sections cemented, soldered or welded together. A shell with a desired configuration may be produced in any desired manner such as by casting, die casting, injection molding or otherwise produced by conventional well-known production techniques. The external surface of the shell is completely noncritical in regard to the production of the precision casting. The internal surfaces 12 in shell 10 are formed with precision and surface smoothness which are consistent with conventional production techniques for the shell but it is not necessary to provide the surfaces 12 with optical quality finish but, instead, the surface may have a finish quality that is many times less than that required for the optical component including the inner face between the cladding and core material to be ultimately formed.

It is preferred after production of the optical component according to the method of the present invention that the shell 10 remain part of the finished product. By fabricating the shell from suitable material, such as glass, metal, ceramic, certain plastics or certain composite materials, the shell serves as a mechanical reinforcement and a protective cover which permits the finished product to be used at an elevated temperature and in other environments not necessarily compatible with the plastic materials when employed to form the optical component within the shell.

Figure 2:
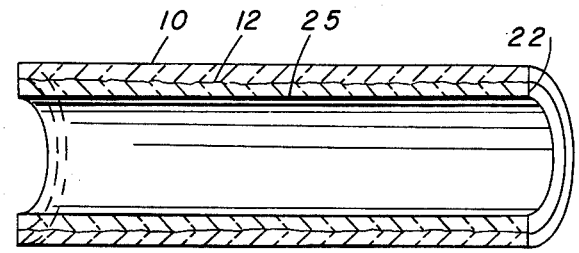
FIG. 2 is a partial sectional view taken along line II—II of FIG. 1 to illustrate the cladding of barrier material prior to the casting of core material.
Figure 4:
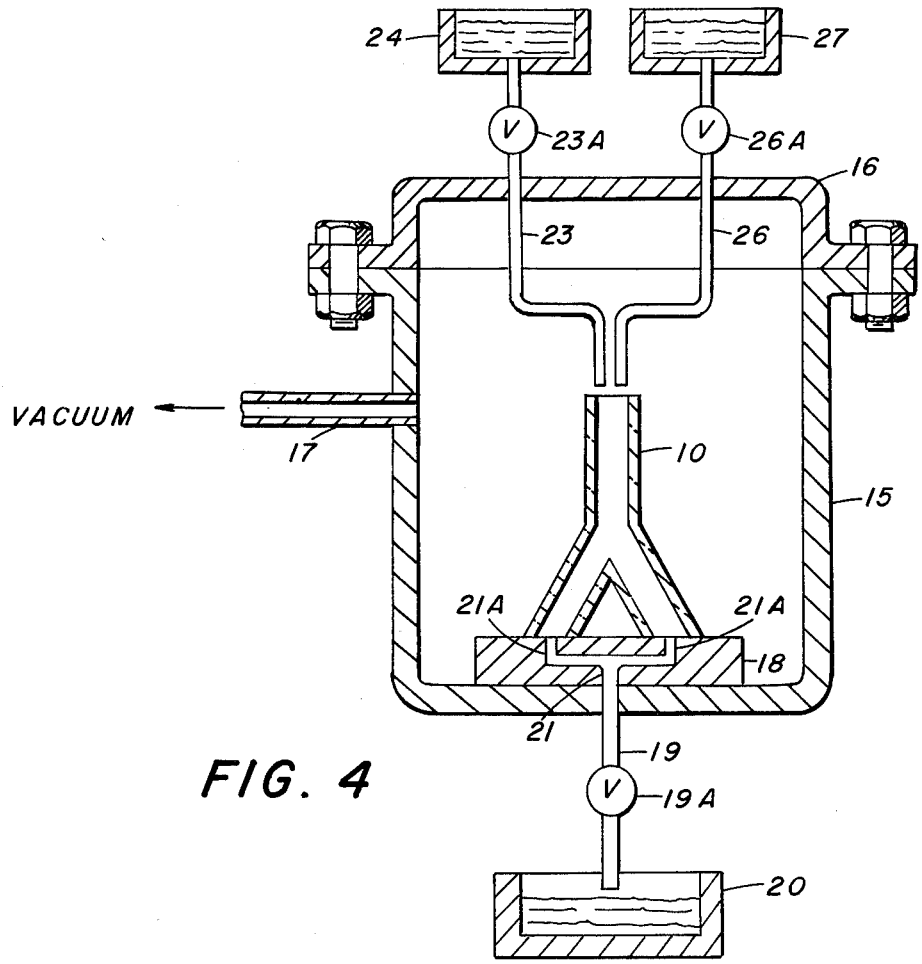
FIG. 4 is an illustration of a typical form of apparatus for producing complex precision castings of clad optical components according to the present invention.

As shown in FIG. 4, the shell 10 is placed within a vessel 15 having a removable lid 16 which is clamped by bolts and nuts or the like in a manner so that a subatmospheric pressure within the vessel is established and maintained by a vacuum applied to pipe 17. A support block 18 on the floor of the vessel supports the shell in an inverted position as shown. A drain line 19 with a valve 19A extends between a tank 20 and internal passageway 21 formed in the support block 18. This passageway 21 includes branches 21A that communicate with the branched ends of the Y-shaped shell 10 for draining catalyzed liquid resin, liquid thermoplastic, or other material with optical properties required to form a barrier by a cladding 22, FIGS. 1 and 2, on the internal surfaces 12. Such barrier material is fed into the shell from a tube 23 including a flow control valve 23A from a reservoir 24, Preferably, a vacuum is applied to the vessel 15, and thereby the entire shell, while the shell is filled with cladding material. The applied vacuum insures complete removal of trapped gases which might cause incomplete wetting of the internal surfaces in the shell. The cladding material is then allowed to drain from the shell by opening valve 19A. The draining is incomplete so as to leave a coating of cladding material upon the internal surface which is then cured in a necessary manner to form a solid coating of cladding 22. The cladding material fed from tank 24, when having the proper viscosity, will yield a cured coating having a surface finish that is optically superior to the internal surface of the shell. As shown in FIG. 2, at this stage in the process, the internal cladding 22 defines an optical quality surface 25 by the cladding upon the relatively rough surface 12 of the shell.

Figure 3:
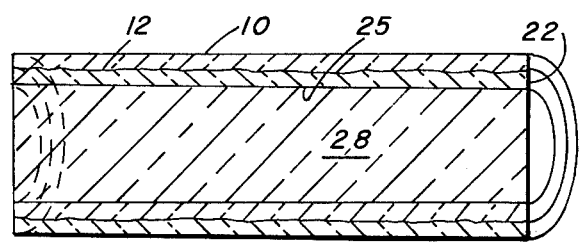
FIG. 3 is a view similar to FIG. 2 and illustrating the finished product after casting of the core material.

The process for curing of the coating of cladding material is carried out on the basis of the material utilized to form the coating. Heating, cooling and action of a catalyst are examples of typical curing processes. After the cladding is cured, the clad shell is filled with a core material of a catalyzed liquid resin, liquid thermoplastic or other material with the optical properties required for the core of the optical component. The selected core material is fed into the clad shell from a tube 26 including a flow control valve 26A from a reservoir 27. A vacuum is again preferably applied to the entire shell during the filling process to remove trapped gases which may cause incomplete wetting, bubbles or other imperfections. The cast core is then cured by employing the curing process previously described to form a solid core 28 with the desired optical properties, as shown in FIG. 3. After the core material is cured, the optical component is removed from the vessel 15. Optical entrance or exit surfaces 30 are formed by grinding, polishing or other finishing. Surfaces 30 are formed for adjoining with optical fibers and/or other optical devices. The material used to form the core 28 is selected to provide an index of refraction which is greater than the index of refraction of the cladding 22. Different materials or doping of one material may be used for this purpose.

By employing the process of the present invention to produce a clad optical device, the continuity of core and cladding is guaranteed by filling the volume of the shell with a fluid from which air or other gases has been exhausted. Moreover, the critical boundary surface, once formed, is in no way handled or otherwise subjected to treatment which might result in surface abrasion or contamination.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A method for precision casting of clad optical components for use with a light-conducting optical fiber, said method including the steps of:
    selecting a hollow shell having an internal surface defining a desired barrier configuration to reflect electromagnetic wave energy,
    filling the shell with a liquid barrier material to completely wet the internal surface of the shell with the liquid barrier material,
    forming a liquid cladding of barrier material upon the internal surface of said shell by incomplete draining of the barrier material from the shell,
    thereafter curing the liquid cladding of barrier material remaining upon the internal surface of the shell to form a desired optical barrier,
    thereafter casting a core of fiber optic material having an index of refraction greater than the index of refraction of the cured barrier material, and
    thereafter forming optical entrance and exit surfaces on the cast core for adjoining with the end of at least one optical fiber.

2. The method of claim 1 including the further step of using the selected hollow shell to form a mechanical reinforcement for the clad casting of the optical component.

3. The method of claim 1 wherein a vacuum is applied to the shell during said filling of the shell with liquid barrier material.

4. The method of claim 3 wherein a vacuum is applied to the cladding of cured barrier material during said casting of a core of fiber optic material.

5. The method of claim 1 wherein said barrier material has a viscosity selected to form upon the internal surface of said shell upon draining and curing thereof, a desired optical quality boundary surface between the cured cladding of barrier material and the cast core of fiber optic material.

6. The method according to claim 1 wherein said selecting a hollow shell includes fabricating a hollow shell from materials selected from the group consisting of glass, metal, ceramic and plastic.

7. The method according to claim 1 wherein said liquid barrier material is selected from the group consisting of catalyzed liquid resin and liquid thermoplastic.

8. The method according to claim 1 wherein said core of fiber optic material is cast from a material selected from the group consisting of catalyzed liquid resin and liquid thermoplastic.

* * * * *